the United States Patent (12) United States Patent
Raghavan (10) Patent No.: US 7,774,563 B2
(45) Date of Patent: Aug. 10, 2010

(54) REDUCING MEMORY ACCESS LATENCY FOR HYPERVISOR- OR SUPERVISOR-INITIATED MEMORY ACCESS REQUESTS

(75) Inventor: Ram Raghavan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 11/621,189

(22) Filed: Jan. 9, 2007

(65) Prior Publication Data
US 2008/0168241 A1 Jul. 10, 2008

(51) Int. Cl.
G06F 13/00 (2006.01)
G06F 13/28 (2006.01)

(52) U.S. Cl. ............... 711/158; 711/154; 711/E12.033
(58) Field of Classification Search ........................ None
See application file for complete search history.

(56) References Cited

U.S. PATENT DOCUMENTS 5,557,578 A * 9/1996 Kelly .......................... 365/222
2005/0114605 A1* 5/2005 Iyer ............................. 711/133

* cited by examiner

Primary Examiner—Kevin Verbrugge
Assistant Examiner—Eric S Cardwell
(74) Attorney, Agent, or Firm—Yee & Associates, P.C.; Diana R. Gerhardt (57) ABSTRACT

A computer-implemented method, data processing system, and computer usable program code are provided for reducing memory access latency. A memory controller receives a memory access request and determines if an address associated with the memory access request falls within an address range of a plurality of paired memory address range registers. The memory controller determines if an enable bit associated with the address range is set to 1 in response to the address falling within one of the address ranges. The memory controller flags the memory access request as a high-priority request in response to the enable bit being set to 1 and places the high-priority request on a request queue.

A dispatcher receives an indication that a memory bank is idle. The dispatcher determines if high-priority requests are present in the request queue and, if so, sends the earliest high-priority request to the idle memory bank.

14 Claims, 6 Drawing Sheets

*FIG. 6*

REDUCING MEMORY ACCESS LATENCY FOR HYPERVISOR- OR SUPERVISOR-INITIATED MEMORY ACCESS REQUESTS

BACKGROUND

1. Field of the Invention

The present application relates generally to memory access. More specifically, the present application relates generally to a computer-implemented method, data processing system, and computer usable program code for reducing memory access latency for hypervisor- or supervisor-initiated memory access requests.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system, or multiple heterogeneous operating systems, to be simultaneously run on a single data processing system platform. A partition, within which an operating system image runs, is assigned a non-overlapping subset of the platform's resources. These platform allocatable resources include one or more architecturally distinct processors, and their interrupt management area, regions of system memory and input/output (I/O) adapter bus slots. The partition's resources are represented by the platform's firmware to the operating system image.

Each distinct operating system, or image of an operating system running within a platform, is protected from each other such that software errors on one logical partition cannot affect the correct operations of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system, directly controls a distinct set of allocatable resources within the platform.

With respect to hardware resources in a logical partitioned data processing system, these resources are disjointly shared among various partitions. These resources may include, for example, input/output (I/O) adapters, memory dual in-line memory modules (DIMMs), non-volatile random access memory (NVRAM), and hard disk drives. Each partition within a LPAR data processing system may be booted and shut down over and over without having to power-cycle the entire data processing system.

When a system with multiple processors accesses a shared memory, the memory at times could be kept busy by the concurrent accesses from several processors. Under such busy conditions, a read or write access to a shared memory, initiated by the processor in supervisor or hypervisor state, could get queued up behind other application requests in the front of the queue. The queuing latency suffered by any read or write request would depend on the number of requests that are ahead of read or write request in the memory system queue. Since the hypervisor and supervisor together manage the system resources for maximum efficiency according to user-specified rules, their read requests to memory are generally critical for achieving optimal system performance. Therefore, a useful means is needed by which the memory latency for hypervisor- or supervisor-initiated read or write requests could be reduced.

SUMMARY

The different illustrative embodiments provide a computer-implemented method, data processing system, and computer usable program code for reducing memory access latency. The illustrative embodiments receive a memory access request that includes an address at a memory controller. The illustrative embodiments determine if the address falls within an address range of a plurality of paired memory address range registers. Responsive to the address falling within one of the address range of the plurality of paired memory address range registers, the illustrative embodiments determine if an enable bit is set to 1, wherein the enable bit is associated with the address range within which the address falls. Responsive to the enable bit being set to 1, the illustrative embodiments flag the memory access request as a high-priority request and place the high-priority request on a request queue.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

The illustrative embodiments provide for reducing memory access latency for hypervisor- or supervisor-initiated memory access requests. With reference now to the figures, and in particular with reference to FIG. 1, a block diagram of a data processing system in which the illustrative embodiments may be implemented is depicted. Data processing system 100 may be a symmetric multiprocessor (SMP) system including a plurality of processors/caches 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller 108, which provides an interface to a plurality of local memories 160-163. I/O bus bridge 110 connects to system bus 106 and provides an interface to I/O bus 112. Memory controller 108 and I/O bus bridge 110 may be integrated as depicted.

Figure 1:
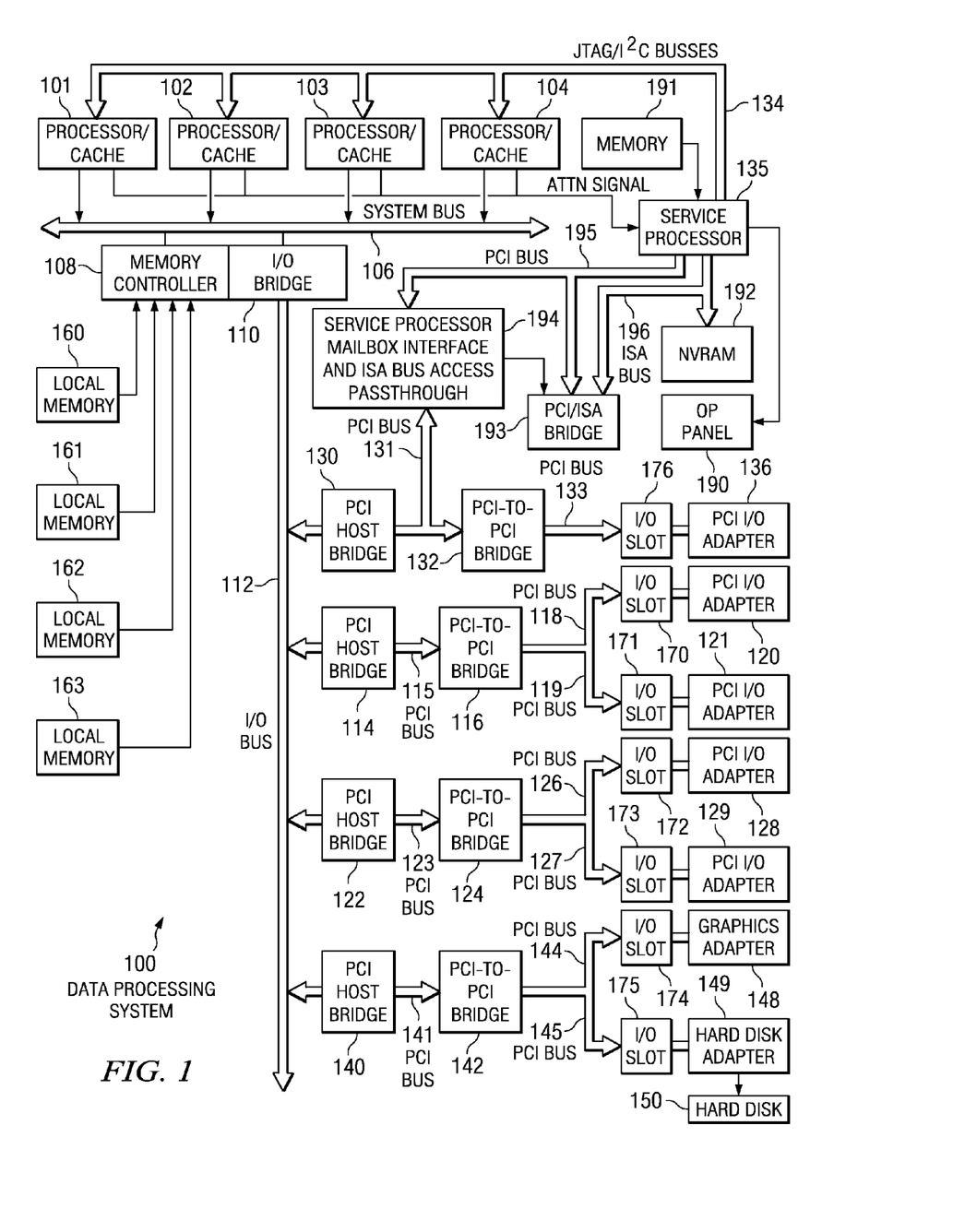
FIG. 1 is a block diagram of a data processing system in which the illustrative embodiments may be implemented.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors/caches 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor/cache 101, some portion of memory from local memories 160-163, and I/O adapters 120, 128, and 129 may be assigned to logical partition P1; processors 102-103, some other portion of memory from local memories 160-163, and PCI I/O adapters 121 and 136 may be assigned to partition P2; and processor 104, yet another portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 connects to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory-mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors/caches 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors/caches 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors/caches 101-104, memory controller 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors/caches 101-104, memory controller 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local (host) memories 160-163. Service processor 135 then releases host processors/caches 101-104 for execution of the code loaded into local memory 160-163. While host processors/caches 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors/caches 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
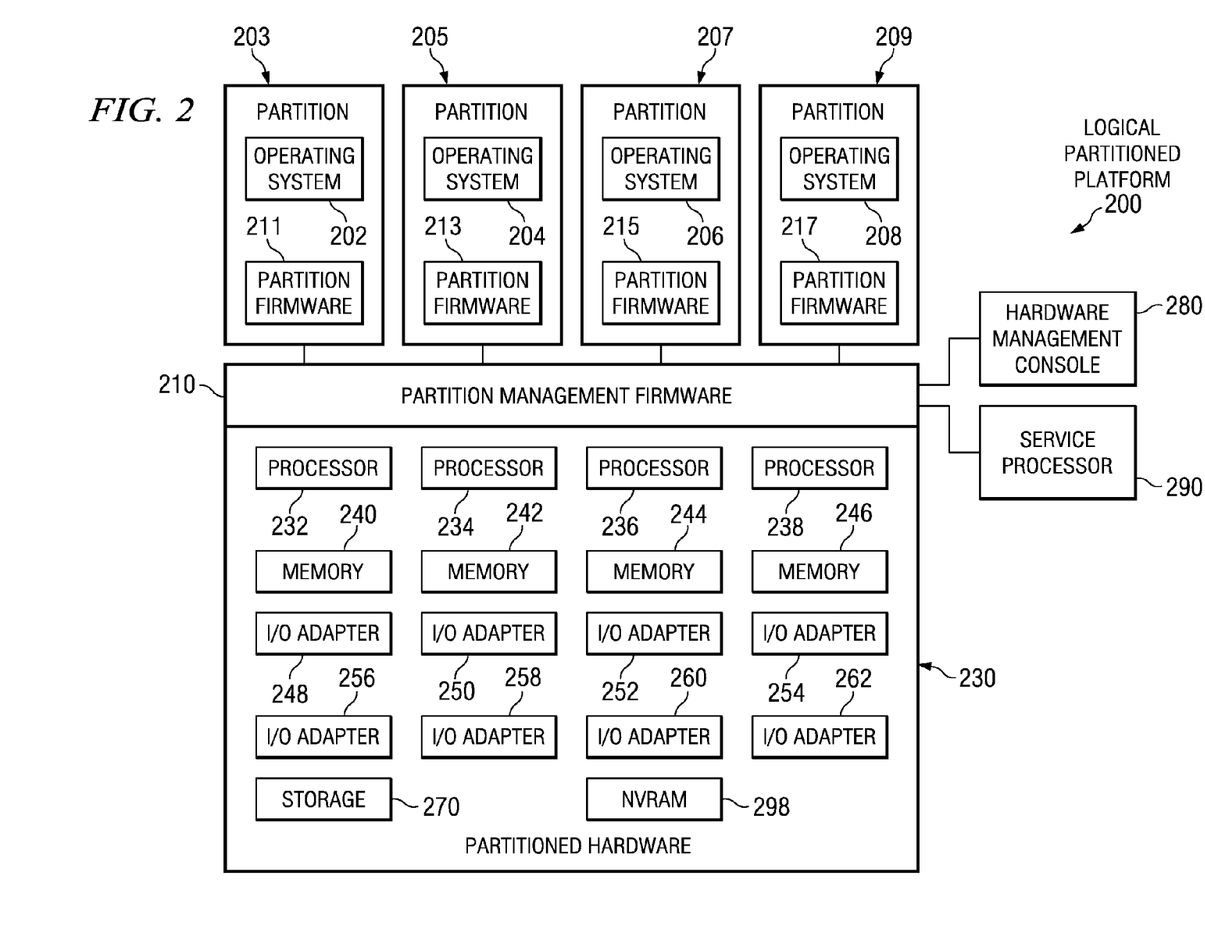
FIG. 2 is a block diagram of an exemplary logical partitioned platform in which the illustrative embodiments may be implemented.

With reference now to FIG. 2, a block diagram of an exemplary logical partitioned platform is depicted in which the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The illustrative embodiments provide for a server system in which each memory controller in the server system has a mechanism by which the memory controller identifies new incoming requests that are from a processor in a supervisor or hypervisor state. The memory controller may be implemented in a single processor system, a homogeneous multiple-processor system, a heterogeneous multiple-processor system, a single partition system, or a multiple-partition system. The memory controller marks such requests as high priority which assists a dispatcher in the memory controller to give these requests a higher priority over others. Identifying high-priority requests aids in reducing latency for the read or write requests and provides an improved overall system performance.

Figure 3:
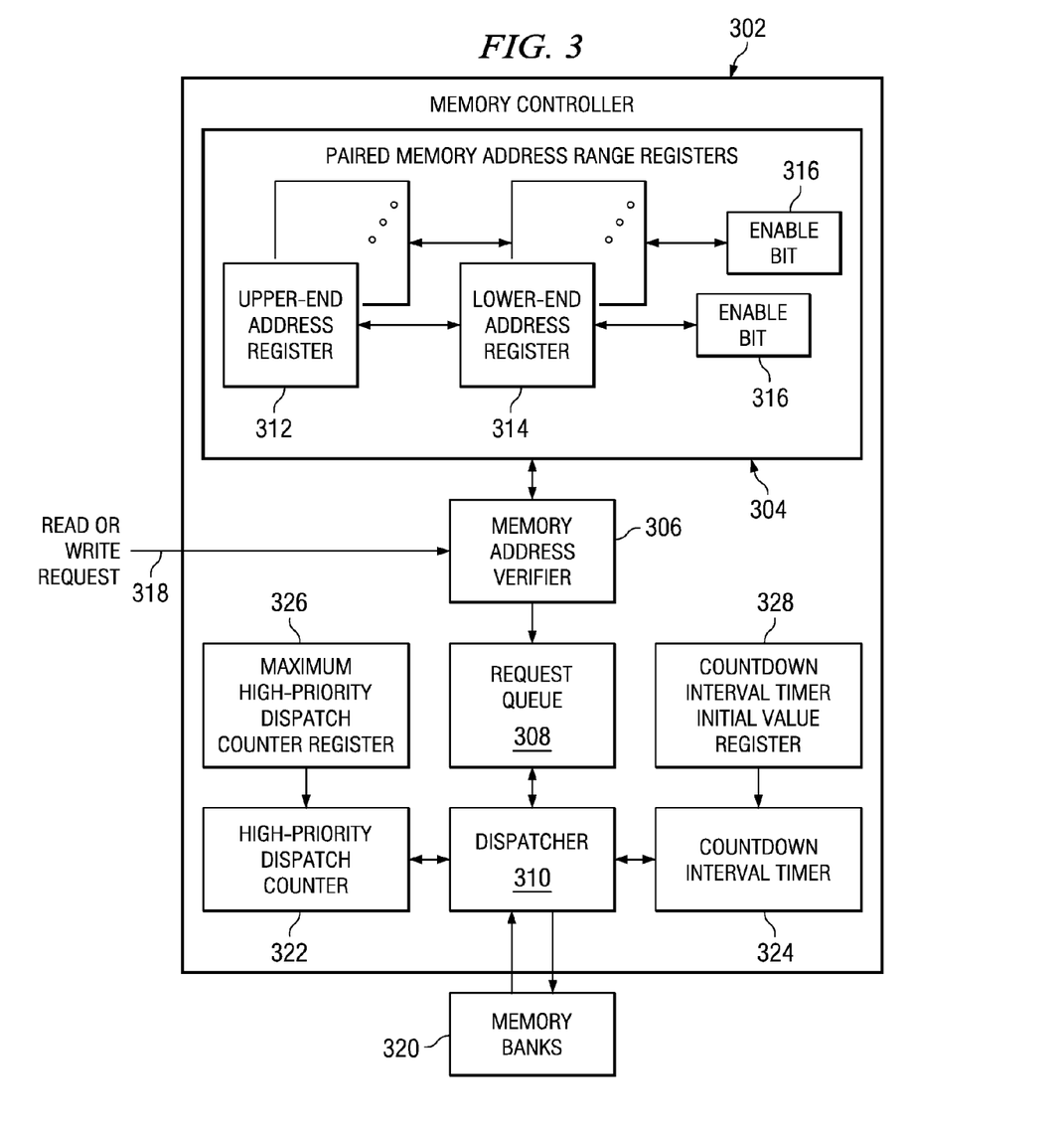
FIG. 3 depicts a functional block diagram of a memory controller in accordance with an illustrative embodiment.

FIG. 3 depicts a functional block diagram of a memory controller in accordance with an illustrative embodiment. Memory controller 302, which is a memory controller, such as memory controller 108 in FIG. 1, includes paired memory address range registers 304, memory address verifier 306, request queue 308, and dispatcher 310. Memory controller 302 uses paired memory address range registers 304 to specify the memory address ranges a hypervisor or supervisor should be allowed to access with high priority. The address ranges are predefined by the operating systems running the hypervisor or supervisor. Memory address range registers 304 are paired registers, each pair containing one upper-end address register 312 and one lower-end address register 314. Each pair of memory address range registers 304 also contains Enable bit 316. Enable bit 316 is set by the hypervisor or supervisor. When Enable bit 316 is set to a value of "1", then the address range specified by upper-end address register 312 and lower-end address register 314 is valid. When Enable bit 316 is set to "0", then the address range specified by upper-end address register 312 and lower-end address register 314 is invalid and should be ignored by the memory system.

Whenever a new memory access request, such as read or write request 318, is received by memory controller 302, memory address verifier 306 checks if the address used by read or write request 318 falls within one of the predefined address ranges, as specified by memory address range registers 304. If memory address verifier 306 verifies that the address used by read or write request 318 falls within one of the predefined address ranges, then memory controller 302 marks read or write request 318 with a single-bit priority flag before entering it into request queue 308. Each request in the memory request queue will have this bit either set to a value of "1" if it is a high-priority request or set to a value of "0" if it is a low-priority request. The priority flag is set appropriately for both read and write requests because of potential delays due to read-write and write-read dependencies.

When dispatcher 310 is notified that a memory bank within memory banks 320 is idle, dispatcher 310 scans request queue 308 for a request to dispatch to the idle memory bank in memory banks 320. Memory banks 320 may be a set of memory banks of which there may be one memory bank present in the set. Each memory bank in memory banks 320 spans a part of the entire memory range in the system. To be dispatched to an idle one of memory banks 320, read or write request 318 should access the memory range spanned by the idle one of memory banks 320. Dispatcher 310 gives priority to the requests for which the priority flag is set to "1" over any requests for which the priority flag is set to "0", while maintaining any dependencies among the requests. Dispatcher 310 then dispatches the earliest high-priority request to the idle one of memory banks 320. If no such high-priority request is found in the request queue, dispatcher 310 would choose from among the low-priority requests in the queue, if any. Dispatcher 310 then dispatches the earliest low-priority request to the idle one of memory banks 320.

In order to prevent high-priority requests forever blocking any low-priority requests in the request queue from being dispatched, memory controller 302 includes high-priority dispatch counter 322 and countdown interval timer 324. High-priority dispatch counter 322 counts the number of high-priority dispatches during a given interval. Dispatcher 310 compares the value of high-priority dispatch counter 322 to the value set in maximum high-priority dispatch counter register 326 to see if a maximum number of high-priority request dispatches have been reached. Thus, dispatcher 310 uses the count of high-priority dispatch counter 322 to limit how many such high-priority requests could be dispatched in a specified interval. Countdown interval timer 324 is a timer that starts counting down from a pre-specified time when dispatcher 310 dispatches a first high-priority request. Countdown interval timer 324 resets to the pre-specified time value stored in countdown interval timer initial value register 328 when countdown interval timer 324 reaches zero.

If dispatcher 310 dispatches a specified maximum number of high-priority requests within a time interval, then dispatcher 310 will stop dispatching high-priority requests and treat them as equal to the low-priority requests and start sending out requests by the order in which they appear in request queue 308. High-priority dispatch counter 322 counts the number of high-priority requests, and the time interval is tracked by countdown interval timer 324 in these examples. Dispatcher 310 continues sending out requests in the order as the requests appear until the timer interval is completed or no more requests are present to be sent out, at which time high-priority dispatch counter 322 is reset back to the maximum value, and countdown interval timer 324 is restarted, allowing high-priority requests to get high priority again.

Figure 4:
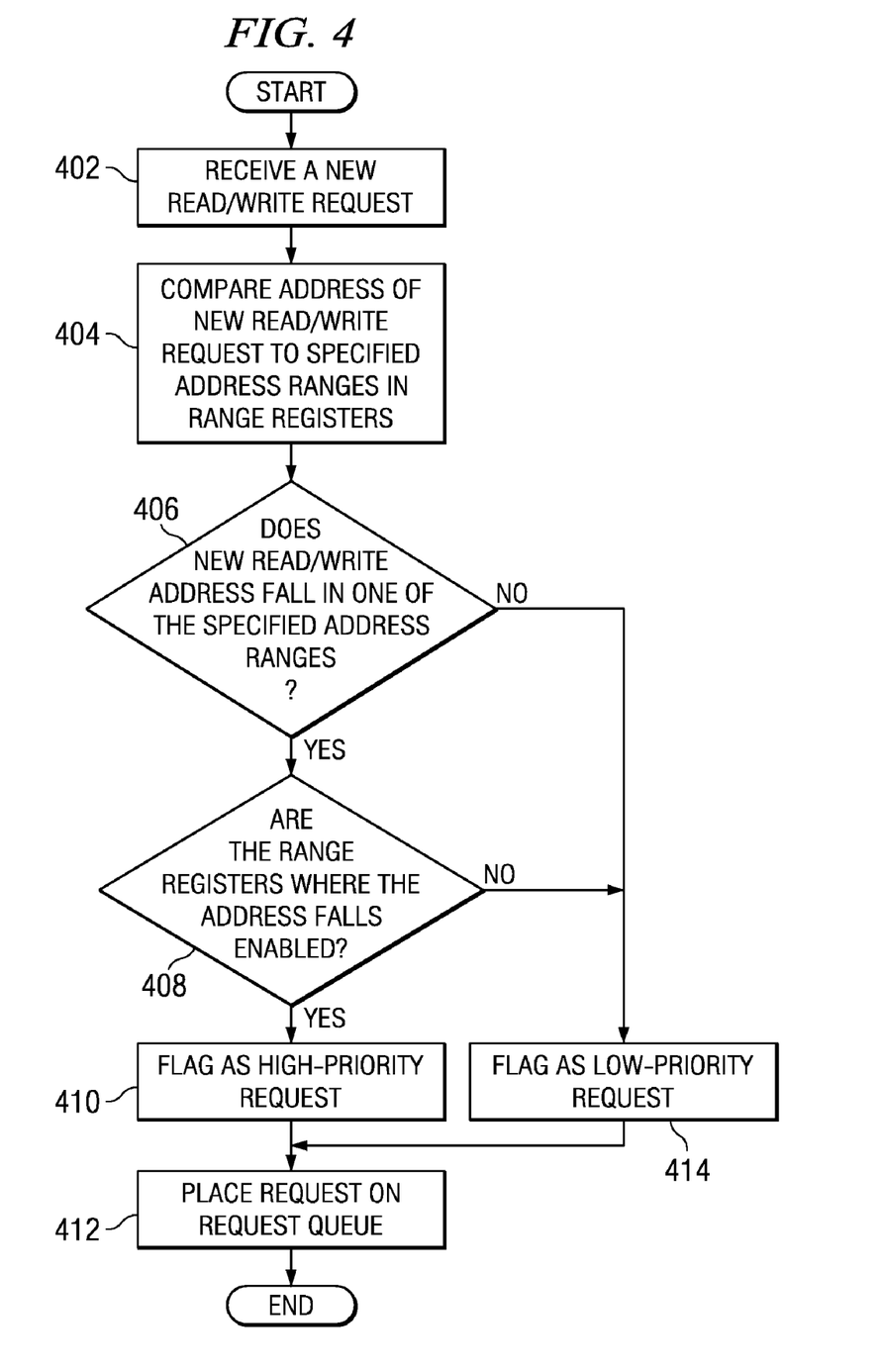
FIG. 4 depicts a flowchart of the operation used to determine high-priority requests in accordance with an illustrative embodiment.

FIG. 4 depicts a flowchart of the operation used to determine high-priority requests in accordance with an illustrative embodiment. The operation is performed by the components of a memory controller, such as memory controller 302 in FIG. 3.

As the operation begins, the memory controller receives a new read or write request, which is a memory access request (step 402). A memory address verifier, such as memory address verifier 306 in FIG. 3, within the memory controller compares the address used by new read or write request with the predefined address ranges specified by pairs of memory address range registers (step 404). Then, the memory address verifier determines if the address of the new read or write request falls within one of the specified ranges (step 406).

If the address of the new read or write request falls within one of the specified ranges, then the memory address verifier determines if the enable bit for the memory address range registers where the address of the new read or write request falls is enabled (step 408). If the enable bit for the memory address range registers is enabled, the memory controller flags the new read or write request as high-priority (step 410). Then, the memory controller places the high-priority request on the request queue (step 412), with the operation terminating thereafter.

Returning to step 406, if the address of the new read or write request fails to fall within one of the specified ranges, then the memory controller flags the new read or write request as low-priority (step 414). Then, the memory controller places the low-priority request on the request queue (step 412), with the operation terminating thereafter.

Returning to step 408, if the address of the new read or write request falls within one of the specified ranges, but the enable bit for the memory address range registers is disabled, then the memory controller flags the new read or write request as low-priority (step 414). Then, the memory controller places the low-priority request on the request queue (step 412), with the operation terminating thereafter.

Figure 5:
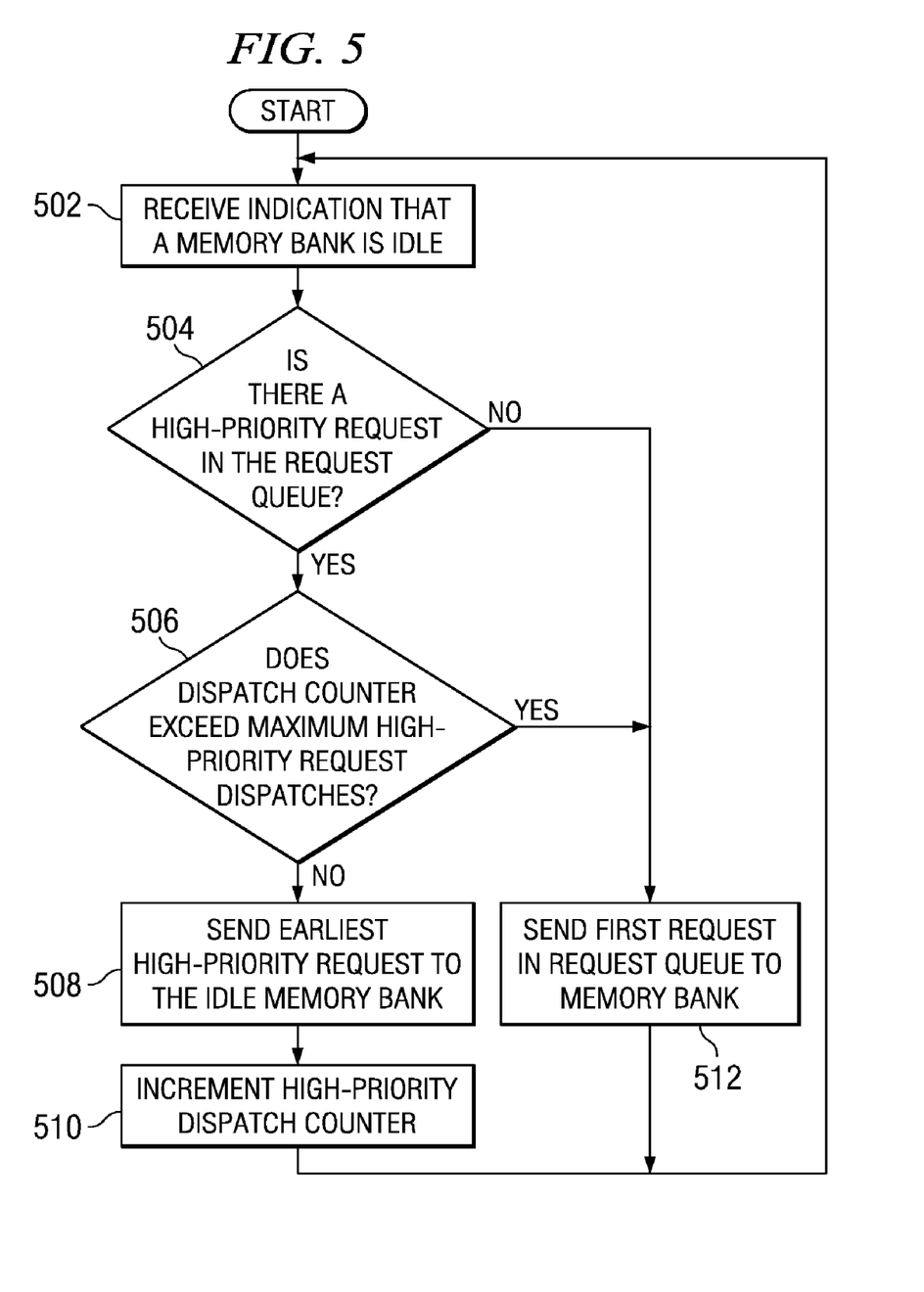
FIG. 5 depicts a flowchart of the operation used to dispatch high-priority requests in accordance with an illustrative embodiment.

FIG. 5 depicts a flowchart of the operation used to dispatch high-priority requests in accordance with an illustrative embodiment. In these examples, the operation is performed by the components of a memory controller, such as memory controller 302 in FIG. 3.

As the operation begins, a dispatcher, such as dispatcher 310 in FIG. 3, within the memory controller receives a notification that a memory bank is idle (step 502). Next, the dispatcher determines if there is a high-priority request in a request queue that may be dispatched to the idle memory bank in memory banks (step 504). The dispatcher gives priority to the high-priority flagged requests over any non-flagged requests, while maintaining any dependencies among the requests.

If at step 504, a high-priority request is present in the request queue, the dispatcher determines if a maximum number of high-priority requests have been sent out (step 506). The dispatcher compares the value of a high-priority dispatch counter to the value set in a maximum high-priority dispatch counter register, such as maximum high-priority dispatch counter register 326 of FIG. 3, to see if a maximum number of high-priority request dispatches have been reached. Thus, the dispatcher uses the count of a high-priority dispatch counter to limit how many such high-priority requests may be dispatched in a specified interval.

If at step 506, the maximum number of high-priority requests has not been sent out, the dispatcher sends the earliest high-priority request to the idle memory bank (step 508). Then, the dispatcher increments the high-priority dispatch counter (step 510), with the operation returning to step 502 thereafter. Returning to step 504, if only low-priority requests are present in the request queue, the dispatcher sends out the first request in the request queue to the idle memory bank (step 512), with the operation returning to step 502 thereafter. Returning to step 506, if the maximum number of high-priority requests has been sent out, the dispatcher sends out the first request in the request queue to the idle memory bank (step 512), with the operation returning to step 502 thereafter.

Figure 6:
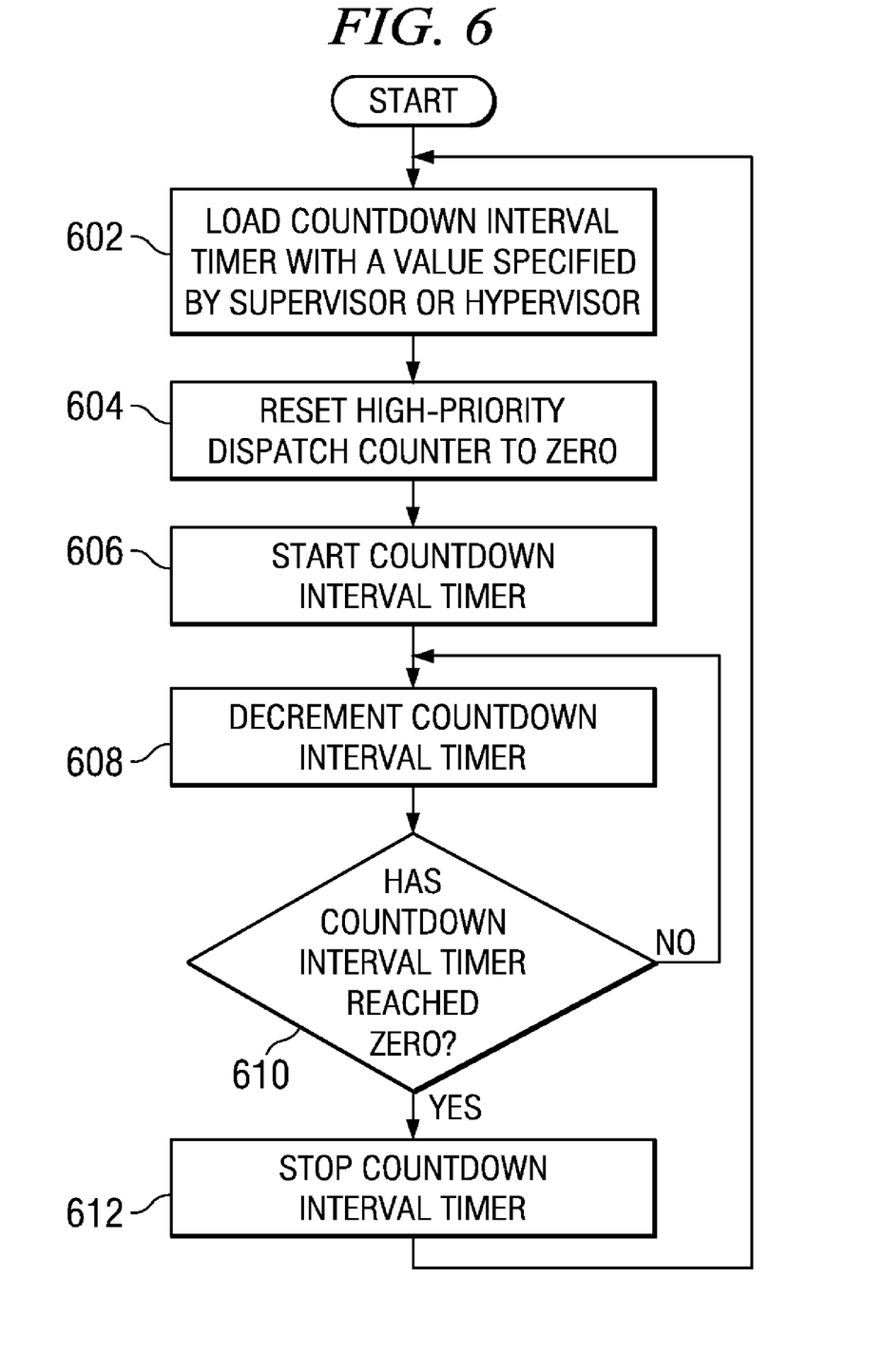
FIG. 6 depicts a flowchart of the operation of a countdown interval timer used with dispatching high-priority requests in accordance with an illustrative embodiment.

FIG. 6 depicts a flowchart of the operation of a countdown interval timer used with dispatching high-priority requests in accordance with an illustrative embodiment. As the operation begins, the countdown interval timer, such as countdown interval timer 324 of FIG. 3, loads a value that is specified by the supervisor or the hypervisor (step 602). This value is stored in a countdown interval timer initial value register, such as countdown interval timer initial value register 328 of FIG. 3. Then, the dispatcher resets the high-priority dispatch counter to a value of zero (step 604). The dispatcher starts the countdown interval timer (step 606) and the countdown interval timer is decremented every clock (step 608). The dispatcher determines if the countdown interval timer has reached zero (step 610). If at step 610 the timer has not reached zero, then the operation returns to step 608. If at step 610 the timer has reached zero, the countdown interval timer stops counting (step 612), with the operation returning to step 602 thereafter.

Thus, the illustrative embodiments provide for reducing memory access latency. A memory access request that includes an address is received at a memory controller. The memory controller determines if the address falls within an address range of a plurality of paired memory address range registers. Responsive to the address falling within one of the address ranges of the plurality of paired memory address range registers, the memory controller determines if an enable bit is set to 1. The enable bit is associated with the address range within which the address falls. Responsive to the enable bit being set to 1, the memory controller flags the memory access request as a high-priority request and places the high-priority request on a request queue.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer-implemented method for reducing memory access latency, the method comprising:
    receiving, at a memory controller, a memory access request, wherein the memory access request includes an address;
    determining if the address falls within an address range of a plurality of paired memory address range registers;
    responsive to the address falling within one of the address range of the plurality of paired memory address range registers, determining if an enable bit is set to 1, wherein the enable bit is associated with the address range within which the address falls;
    responsive to the enable bit being set to 1, flagging the memory access request as a high-priority request;
    placing the high-priority request on a request queue;
    receiving an indication, at a dispatcher in the memory controller, that a memory bank in a set of memory banks is idle forming an idle memory bank;
    determining if a set of high-priority requests is present in the request queue;
    responsive to an existence of the set of high-priority requests, sending an earliest high-priority request from the set of high-priority requests to the idle memory bank;
    starting a countdown interval timer for a predetermined time interval; and
    incrementing a high-priority dispatch counter each time the set of high-priority requests is dispatched.

2. The method of claim 1, further comprising:
    responsive to the address falling outside all of the address ranges of the plurality of paired memory address range registers, flagging the memory access request as a low-priority request; and
    placing the low-priority request on the request queue.

3. The method of claim 1, further comprising:
    responsive to the enable bit being set to 0, flagging the memory access request as a low-priority request; and
    placing the low-priority request on the request queue.

4. The method of claim 1, further comprising:
    determining if a maximum number of high-priority requests indicated by the high-priority dispatch counter have been dispatched in the predetermined time interval;
    responsive to the maximum number of high-priority requests being dispatched in the predetermined time interval, preempting the sending of any more of the set of high-priority requests to the idle memory bank; and
    sending a first appearing request in the request queue to the idle memory bank.

5. The method of claim 4, further comprising:
responsive to the predetermined time interval expiring, resetting the countdown interval timer.

6. The method of claim 1, wherein the memory controller is in at least one of a single processor system, a homogeneous multiple-processor system, a heterogeneous multiple-processor system, a single partition system, or a multiple-partition system.

7. A data processing system comprising:
a bus system;
a communications system connected to the bus system;
a memory connected to the bus system, wherein the memory includes a set of instructions; and
a memory controller connected to the bus system, wherein the memory controller executes the set of instructions to receive a memory access request, wherein the memory access request includes an address; determine if the address falls within an address range of a plurality of paired memory address range registers; determine if an enable bit is set to 1 in response to the address falling within one of the address range of the plurality of paired memory address range registers, wherein the enable bit is associated with the address range within which the address falls; flagging the memory access request as a high-priority request in response to the enable bit being set to 1; place the high-priority request on a request queue; receive an indication, at a dispatcher in the memory controller, that a memory bank in a set of memory banks is idle forming an idle memory bank; determine if a set of high-priority requests is present in the request queue; send an earliest high-priority request from the set of high-priority requests to the idle memory bank in response to an existence of the set of high-priority requests; start a countdown interval timer for a predetermined time interval; and increment a high-priority dispatch counter each time the set of high-priority requests is dispatched.

8. The data processing system of claim 7, wherein the memory controller executes the set of instructions to flag the memory access request as a low-priority request in response to the address falling outside all of the address ranges of the plurality of paired memory address range registers; and place the low-priority request on the request queue.

9. The data processing system of claim 7, wherein the memory controller executes the set of instructions to flagging the memory access request as a low-priority request in responsive to the enable bit being set to 0; and place the low-priority request on the request queue.

10. The data processing system of claim 7, wherein the memory controller executes the set of instructions to determine if a maximum number of high-priority requests indicated by the high-priority dispatch counter have been dispatched in the predetermined time interval; preempt the sending of any more of the set of high-priority requests to the idle memory bank in response to the maximum number of high-priority requests being dispatched in the predetermined time interval; send a first appearing request in the request queue to the idle memory bank; and reset the countdown interval timer in response to the predetermined time interval expiring.

11. A computer program product comprising:
a computer usable medium including computer usable program code stored thereon for reducing memory access latency, the computer program product including:
computer usable program code for receiving a memory access request, wherein the memory access request includes an address;
computer usable program code for determining if the address falls within an address range of a plurality of paired memory address range registers;
computer usable program code for determining if an enable bit is set to 1 in response to the address falling within one of the address range of the plurality of paired memory address range registers, wherein the enable bit is associated with the address range within which the address falls;
computer usable program code for flagging the memory access request as a high-priority request in response to the enable bit being set to 1;
computer usable program code for placing the high-priority request on a request queue;
computer usable program code for receiving an indication that a memory bank in a set of memory banks is idle forming an idle memory bank;
computer usable program code for determining if a set of high-priority requests is present in the request queue;
computer usable program code for sending an earliest high-priority request from the set of high-priority requests to the idle memory bank in response to an existence of the set of high-priority requests;
computer usable program code for starting a countdown interval timer for a predetermined time interval; and
computer usable program code for incrementing a high-priority dispatch counter each time the set of high-priority requests is dispatched.

12. The computer program product of claim 11, further including:
computer usable program code for flagging the memory access request as a low-priority request in response to the address falling outside all of the address ranges of the plurality of paired memory address range registers; and
computer usable program code for placing the low-priority request on the request queue.

13. The computer program product of claim 11, further including:
computer usable program code for flagging the memory access request as a low-priority request in response to the enable bit being set to 0; and
computer usable program code for placing the low-priority request on the request queue.

14. The computer program product of claim 11, further including:
computer usable program code for determining if a maximum number of high-priority requests indicated by the high-priority dispatch counter have been dispatched in the predetermined time interval;
computer usable program code for preempting the sending of any more of the set of high-priority requests to the idle memory bank in response to the maximum number of high-priority requests being dispatched in the predetermined time interval;
computer usable program code for sending a first appearing request in the request queue to the idle memory bank; and
computer usable program code for resetting the countdown interval timer in response to the predetermined time interval expiring.

* * * * *